No. 834,848.   PATENTED OCT. 30, 1906.
G. W. PRICE.
PACKING FOR JOINTS BETWEEN STATIONARY AND MOVING PARTS OF MACHINERY.
APPLICATION FILED MAR. 12, 1903.
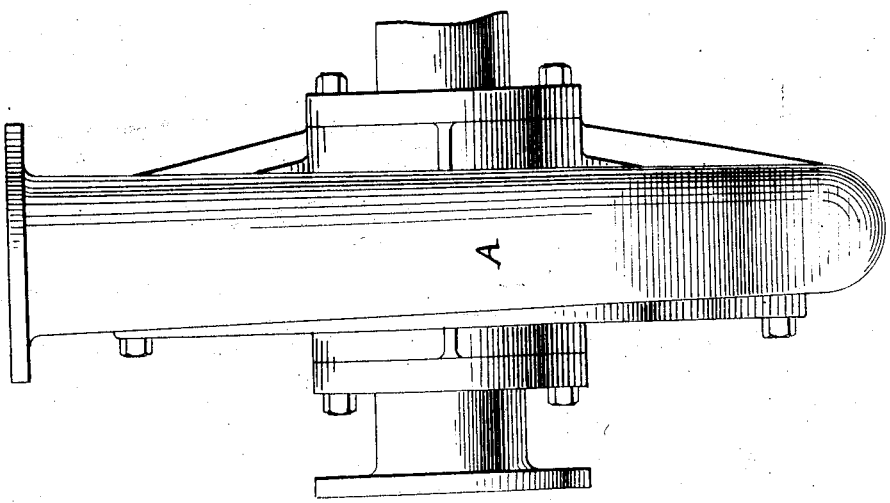
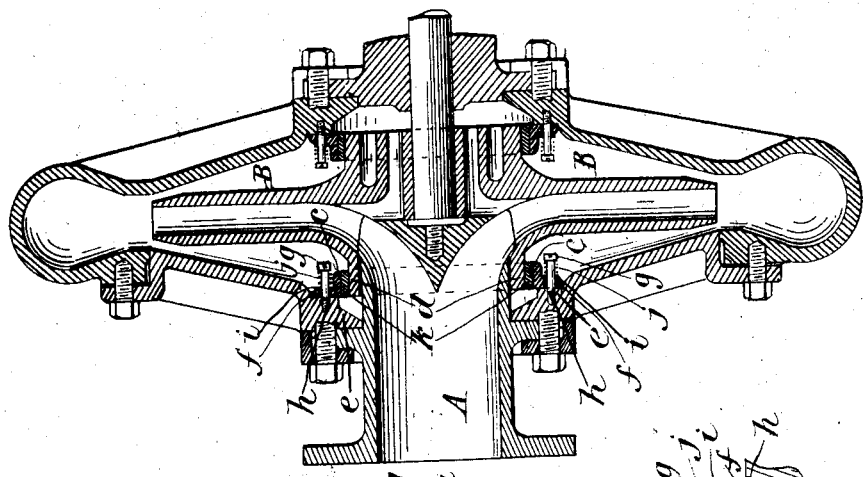
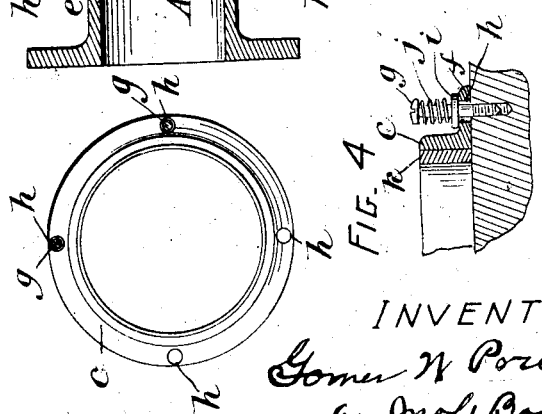
WITNESSES:
INVENTOR:

UNITED STATES PATENT OFFICE.

GOMER W. PRICE, OF OAKLAND, CALIFORNIA, ASSIGNOR OF ONE-HALF TO KROGH MANUFACTURING CO., OF SAN FRANCISCO, CALIFORNIA, A CORPORATION OF CALIFORNIA.

PACKING FOR JOINTS BETWEEN STATIONARY AND MOVING PARTS OF MACHINERY.

No. 834,848.     Specification of Letters Patent.     Patented Oct. 30, 1906.

Application filed March 12, 1903. Serial No. 147,548.

*To all whom it may concern:*

Be it known that I, GOMER W. PRICE, a citizen of the United States, residing at the city of Oakland, county of Alameda, State of California, have invented certain new and useful Improvements in Packing for Joints Between Stationary and Moving Parts of Machinery; and I do hereby declare the following to be a full, clear, and exact description of said invention, such as will enable others skilled in the art to which it most nearly appertains to make, use, and practice the same.

My invention relates to a novel means and device for packing the joint between a stationary and a moving part of mechanism when it is desired to prevent water under pressure from passing through the joint, and it is especially applicable in centrifugal pumps where the impeller is driven with a rotary motion inside of a stationary case or shell and where the water which is passing through the pump is liable to pass out through the joint between the impeller and the stationary part of the pump.

It consists of what I call a "floating metallic ring," which is so applied to the joint that it accommodates itself to the moving part, yet effectually closes the joint against the passage of water through it.

Referring to the accompanying drawings, Figure 1 represents a front view of my packing-ring. Fig. 2 represents a vertical section of a centrifugal pump, showing my packing-ring applied to the joints between the moving and stationary parts. Fig. 3 is a side elevation of the centrifugal pump, and Fig. 4 is an enlarged sectional view of the ring and its fastenings.

Let A represent a stationary piece of mechanism, which in this instance is the suction-pipe and inclosing case or shell of a centrifugal pump.

B is the impeller or wheel, which is rotated within this stationary case or shell.

In this class of machinery much trouble and annoyance has been met on account of the leakage of water through the joint between the stationary and moving parts. To avoid this, I employ a metal ring $c$, (shown at Fig. 1,) which fits closely against a shoulder $d$ of the moving part B and is securely bolted to a flange or face $e$ of the stationary part A, thereby closing the joint and furnishing a ground seat to fit the moving part. This ring is made with an inner flange $f$ on one side, so that it presents the form of an angle-iron in cross-section, and the bolts $g$, which secure it to the stationary part of the machine, pass through the flange $f$.

The holes $h$, through which the bolts $g$ pass, are made considerable larger in diameter than the bolts which pass through them, so as to allow the ring to shift and move about, and thereby accommodate itself to the moving part. To confine it in place, I slip a washer $i$ on the bolt. The washer is larger than the diameter of the hole through which it passes, and I interpose a spiral spring $j$ between the washer and the head of the bolt, so that when the bolt is inserted through the hole $h$ and screwed into the stationary part A they will keep the ring in place, yet allow it to move and adjust itself to its seat.

$k$ represents a ring which is shrunk or otherwise secured to the moving part $c$ to provide a wearing-face for the floating ring. Its use will be a convenience in preserving a true and close joint, as it can be readily renewed when the joint-surface wears down; but its use is not indispensable, as the floating ring might be faced against the moving part without the wearing-ring.

It will be observed by referring to Fig. 2 that the casing on both sides is of such a configuration as to provide clear open spaces adjacent to the shoulders $d$ of the impeller, as represented at $s$. These spaces permit the impeller to move slightly when caused to do so by end thrust taking effect in either direction without coming into contact with the casing and without affecting in any way the security of the joint protected by the packing-ring.

Having thus described my invention, what I claim, and desire to secure by Letters Patent, is—

1. In the class of machinery described, a movable packing-ring secured to the stationary part, and having a ground face fitted against a seat on the moving part, substantially as described.

2. A packing-ring for joints between stationary and moving parts of machinery of the class described, consisting of a ring having a rectangular flange on its inner edge;

holes through said ring; bolts by which said ring is secured to the stationary part, said bolts being smaller in diameter than the diameter of the holes in the ring; washers on said bolts and spiral springs surrounding said bolts between the washers and the heads of the bolts, substantially as described.

3. In the class of machinery described, a movable packing-ring secured to the stationary part, and having a face engaging a seat on the moving part, and provided with means for preventing leakage of water between said face and seat.

4. In the class of machinery described, the combination with a stationary part and a moving part, of a movable packing-ring, having a face engaging a seat on the moving part, and spring-pressed means for securing said ring to the stationary part.

5. In the class of machinery described, a packing-ring adapted to prevent leakage between the stationary and moving parts consisting of a ring having approximately an L shape in cross-section and one or more springs to press said ring against the stationary part.

6. In the class of machinery described, a movable packing-ring secured to the stationary part and having faces engaging seats on said stationary and moving parts and provided with means for preventing leakage of water between said faces and seats.

7. In the class of machinery described, the combination with a stationary part and a movable part, of a movable packing-ring having faces engaging seats on said stationary and moving parts, spring-pressed means for securing said ring to said stationary part, and means for preventing leakage of water between said faces and seats.

8. In the class of machinery described, the combination with a stationary part having an opening, and a moving part in said stationary part, of a packing-ring engaging said moving part, a bolt extending into said opening in the stationary part and engaging said ring, and a spring on said bolt.

9. In the class of machinery described, the combination with a stationary part having an opening, and a moving part in said stationary part, of a packing-ring having faces engaging said stationary and moving parts, a bolt extending into said opening and engaged with said ring, and means carried by the bolt tending to force said packing-ring in one direction.

10. In a centrifugal pump, the combination with a casing having shoulders, and an impeller rotating in said casing, of packing-rings engaging said impeller and provided with adjustable means for connecting them to said casing, comprising bolts extending into said shoulders and engaging said rings, a spring on each bolt, and washers at the end of said spring.

11. In the class of machinery described, a packing-ring placed between the stationary and moving parts, and a wearing-band between the packing-ring and the moving part.

12. In the class of machinery described, a packing-ring placed between the stationary and moving parts, and a wearing-band between the packing-ring and the moving part, and secured to the moving part.

13. In the class of machinery described, a packing-ring secured to the stationary part, and a wearing-band between the packing-ring and the moving part.

14. In the class of machinery described, a packing-ring secured to the stationary part, and a wearing-band between the packing-ring and the moving part, and secured to the moving part.

GOMER W. PRICE.

Witnesses:
A. K. DAGGETT,
H. W. GRISWOLD.